US011711292B2

(12) United States Patent
Pawar et al.

(10) Patent No.: US 11,711,292 B2
(45) Date of Patent: Jul. 25, 2023

(54) PRE-FILTERING OF TRAFFIC SUBJECT TO SERVICE INSERTION (71) Applicant: VMWARE, INC., Palo Alto, CA (US)

(72) Inventors: Sudesh Pawar, Pune (IN); Pierluigi Rolando, Palo Alto, CA (US); Rahul Mishra, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 377 days.

(21) Appl. No.: 16/820,750

(22) Filed: Mar. 17, 2020

(65) Prior Publication Data

US 2021/0226883 A1 Jul. 22, 2021

(30) Foreign Application Priority Data

Jan. 17, 2020 (IN) .............................. 202041002094

(51) Int. Cl.
H04L 45/00 (2022.01)
H04L 45/122 (2022.01)
H04L 45/745 (2022.01)
H04L 45/42 (2022.01)
H04L 9/40 (2022.01)
H04L 69/22 (2022.01)
G06F 9/455 (2018.01)
H04L 45/586 (2022.01)

(52) U.S. Cl.
CPC .......... H04L 45/20 (2013.01); G06F 9/45558 (2013.01); H04L 45/122 (2013.01); H04L 45/42 (2013.01); H04L 45/586 (2013.01); H04L 45/745 (2013.01); H04L 63/0245 (2013.01); H04L 69/22 (2013.01); G06F 2009/45587 (2013.01); G06F 2009/45595 (2013.01)

(58) Field of Classification Search
CPC ......... H04L 45/20; H04L 45/38; H04L 45/42; H04L 45/122; H04L 45/745; H04L 45/586; H04L 63/0227; H04L 69/22; G06F 9/45558; G06F 2009/45587; G06F 2009/45595
See application file for complete search history.

(56) References Cited

U.S. PATENT DOCUMENTS

2020/0204519 A1* 6/2020 Isaev .................... H04L 63/166

FOREIGN PATENT DOCUMENTS

WO WO-2015041706 A1 * 3/2015 ......... H04L 12/6418

* cited by examiner

Primary Examiner — Elton Williams
(74) Attorney, Agent, or Firm — Dinsmore & Shohl LLP (57) ABSTRACT The disclosure provides an approach for pre-filtering traffic in a logical network. One method includes receiving, by a hypervisor, a packet from a virtual computing instance (VCI) and determining a service path for the packet based on a service table. The method further includes setting, by the hypervisor, a pre-filter component as a next hop for the packet based on the service path. The method further includes receiving, by the pre-filter component, the packet. The method further includes making a determination, by the pre-filter component, of whether the packet requires processing by the security component. The method further includes performing, by the pre-filter component, based on the determination, one of: forwarding the packet to its destination and bypassing the security component; or forwarding the packet to the security component.

20 Claims, 5 Drawing Sheets

PRE-FILTERING OF TRAFFIC SUBJECT TO SERVICE INSERTION

RELATED APPLICATIONS

Benefit is claimed under 35 U.S.C. 119(a)-(d) to Foreign Application Serial No. 202041002094 filed in India entitled "PRE-FILTERING OF TRAFFIC SUBJECT TO SERVICE INSERTION" on Jan. 17, 2020, by VMWARE, Inc., which is herein incorporated in its entirety by reference for all purposes.

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain.

For example, the VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

VTEP services may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

It should be noted that the term VTEP originally referred to a "VXLAN tunneling endpoint" and VNI referred to a "VXLAN network identifier." However, while originally the terms "VTEP" and "VNI" referred to "VXLAN" tunneling protocol, they are now often used regardless of the tunneling protocol, and therefore referred to herein as a "virtual" instead. This "backronym" can be misleading as the tunnel is not itself virtual, but does carry logical overlay networking traffic, which is sometimes referred to as virtual network traffic.

SDN involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The control plane is served by an application that can run in a single computing device or on a cluster of devices that communicate with each other and maintain the same state. Typically the centralized control plane (CCP) runs as a cluster to allow for load balancing, fault tolerance, and high availably. The CCP may be considered a central entity, in that even though it may be implemented in a distributed manner, each instance of a control process operates independently to control a portion of the network, as opposed to working in conjunction with different control processes running on different computing devices. Sharding is a mechanism used to provide high scalability and availability of a CCP by identifying "master" nodes among a plurality of nodes within the CCP for handling data from particular sources or of particular types.

VMs may exchange traffic with other endpoints (e.g., physical endpoints, other VMs, etc.) within the data center, referred to as east-west traffic. VMs may further exchange traffic with other endpoints outside the data center, referred to as north-south traffic. Sometimes, the data center is configured to provide network services for the exchange of east-west and/or north-south traffic. The insertion of network services to the path of traffic in the data center is referred to as service insertion. Network services can include, for example, intrusion prevention systems (IPS) and intrusion detection systems (IDS) such as deep packet inspection (DPI) services, access control list (ACL) filters, firewalls, load balancers, etc.

Service insertion works by configuring traffic to be forwarded to network services prior to forwarding the traffic to its actual destination. The mechanisms for forwarding the traffic are discussed in more detail with respect to FIG. 1. For example, the logical overlay network, also referred to as a software defined network (SDN), can include a number of VMs that provide network services, referred to herein as service VMs (SVMs), running on multiple hosts. The term "service VM" is equivalent to the terms "virtual network appliance" and "virtual network function" (VNF), which are also used in the field. In addition, the implementation of network services using virtual machines is often referred to as network function virtualization (NFV). Each SVM may provide a service. For example, an SVM A may provide service A, an SVM B may provide service B, etc. A single SVM may be configured to provide multiple services. Further, there may be multiple SVMs that provide the same service on the same or different hosts, such as to provide load balancing for providing a given service.

In certain cases, one or more network services may process traffic prior to forwarding the traffic to its actual destination. In particular, the traffic is configured to be forwarded to a first SVM to apply a first service, then to a second SVM to apply a second service, and so on, sequentially, until all the requisite services are applied, and the traffic is then forwarded to its actual destination. The forwarding of network traffic to multiple networks services in series is referred to as service chaining. For example, application of service A, then service B, then service C, in sequence, may be referred to as a service chain.

Since there are multiple SVMs providing services in the data center, as discussed, there may be multiple possible paths that traffic can take for application of a given service chain. In other words, since there may be multiple instances of each of service A, service B, and service C, any one network flow (e.g., corresponding to a set of packets with a particular tuple in the packet header, such as a particular source IP address, destination IP address, and port number) can satisfy the requirements of a service chain including A, B, and C services by having packets forwarded first to any one of the "A" services, then any one of the "B" services, and then any one of the "C" services. The actual path that the traffic flows through as network services are applied to the traffic, including the actual SVMs in sequence used to apply the networks services of a service chain, is referred to as a service path. Accordingly, there may be multiple possible service paths corresponding to a service chain.

As encrypted traffic becomes more common in networks, malicious actors are increasingly utilizing encryption to evade detection of malicious traffic. IDS and IPS tools may be employed in order to inspect even encrypted traffic, such as using DPI techniques, in order to ensure safety and security of data centers. Some DPI tools examine only the initial portion of each flow (e.g., SSL handshake packets, which may be identified by particular values in a header of the packets) to determine whether certain elements exchanged between source and destination are compliant with data center security policies. These elements include protocol version, allowed cryptographic and hash algorithm, certificate validation, etc. In certain embodiments, if the DPI tools determine that the initial portion of a flow is compliant with data center security policies, the DPI tools may then determine that the flow is compliant, and that further packets of the flow can be sent to their destination without further inspection. In certain embodiments, if the DPI tools determine that the initial portion of a flow is not compliant with data center security policies, the DPI tools may then determine that the flow is not compliant, and that further packets of the flow should be dropped and not sent to their destination without further inspection.

In some other cases, DPI tools can be configured to perform decryption and deep inspection of encrypted traffic. As an example, some DPI tools support SSL decryption and inspection using SSL proxy methods, such as man-in-the-middle (MITM) techniques. These DPI tools may maintain an exception list or a white list, excluding certain uniform resource locator (URL) categories or applications that either do not work properly with decryption enabled or for any other reason, including for legal or privacy purposes. Decryption policies may be used to exclude traffic from decryption and DPI based on, for example, source, destination, URL category, service (port or protocol), and TCP port numbers. For instance, with SSL decryption enabled, URL categories can be used to exclude traffic that is categorized as financial or health related from decryption and DPI.

In cases where a service only needs to analyze the initial portion of a flow and not the remaining packets of the flow, or does not or cannot analyze certain encrypted packet, it may be wasteful to continue redirecting such packets of the flow that will not be analyzed to the service. However, conventional service insertion is generally an all-or-nothing operation, such that either all packets of a flow are redirected or no packets of the flow are redirected.

In general, and especially in cases where SSL/TLS proxy techniques are used, it is preferable to send as little data as possible to a service. This is especially important when the service runs on a remote node or is not distributed. As such, there is a need in the art for improved techniques of handling traffic subject to service insertion.

SUMMARY

Embodiments provide a method for pre-filtering traffic subject to service insertion. The method includes: receiving, by a hypervisor, a packet from a virtual computing instance (VCI); determining, by the hypervisor, a service path for the packet based on a service table; setting, by the hypervisor, a pre-filter component as a next hop for the packet based on the service path; receiving, by the pre-filter component, the packet; making a determination, by the pre-filter component, of whether the packet requires processing by the security component; and performing, by the pre-filter component, based on the determination, one of: forwarding the packet to its destination and bypassing the security component; or forwarding the packet to the security component.

Further embodiments provide a computer system comprising one or more processors configured to perform the method as set forth above.

Further embodiments include a non-transitory computer-readable storage medium storing instructions that, when executed by a computer system, cause the computer system to perform the method as set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides approaches for pre-filtering traffic subject to service insertion. Certain embodiments involve using service insertion techniques to pre-filter traffic subject to inspection by a security component, such as an IDS or IPS implemented in a service VM, in order to determine whether to forward the traffic to the security component for inspection.

In certain embodiments, pre-filtering is implemented by a pre-filter component implemented as one or more service VMs added by a service insertion platform to a service path prior to a service VM implementing a security component. In some embodiments, the pre-filter component applies rules related to the security component to determine whether to forward the traffic to the security component. The pre-filter component may determine the rules, for example, by receiving configuration input from a user (e.g., a network administrator), from the security component, from a management component, or the like. In some examples, the pre-filter component determines the rules by accessing log data associated with the security component or by snooping configuration data related to the security component.

In one example, a rule indicates that packets that correspond to an exception list or white list are not to be analyzed by the security component, such as because they cannot be decrypted by the security component. Accordingly, if the pre-filter component receives packets that correspond to the exception list or white list, the pre-filter component forwards the packets to their destination and bypasses the security component to avoid unnecessary usage of communication, processing, and storage resources. If the pre-filter component receives packets that do not correspond to the exception list or white list, the pre-filter component forwards the packets to the security component along the normal service path for inspection. The security component, based on the inspection, may then forward the packets to their destination, drop the packets, provide a warning to an administrator, etc.

In another example, a rule indicates that initial handshake packets (e.g., secure sockets layer (SSL) handshake) of each flow are to be analyzed by the security component in order to determine whether certain conditions are met. The pre-filter component may, based on the rule, determine whether each packet it receives is an initial handshake packet, and forward only those packets that it determines to be initial handshake packets to the security component for inspection. Packets determined not to be initial handshake packets may be forwarded to their destination, bypassing the security component and avoiding unnecessary usage of communication, processing, and storage resources.

In certain cases, based on the inspection of the initial handshake packets, the security component determines that the remaining packets for the flow are allowed to be forwarded to their destination and do not need to be analyzed. Accordingly, the security component itself, directly or via another component, or the other component itself snooping configuration data of the security component, configures the service insertion rules (e.g., implemented at a virtual network interface card (VNIC) associated with the source of the packets as discussed herein), such as via an API as discussed herein, to no longer forward packets for the flow to the pre-filter component, but instead forward the packets for the flow directly to their destination, thereby bypassing the pre-filter component and the security component. In cases where the security component determines that the remaining packets for the flow are not allowed to be forwarded to their destination, the security component itself or the other component configures the service insertion rules to drop packets for the flow at the source. In some cases, however, the security component does not have the ability to trigger flow programming, such as if the security component is a third-party IDS/IPS device without native support for flow programming. As such, pre-filtering techniques may be used as described herein.

In some embodiments, the pre-filtering is implemented as part of the service insertion platform. In an example, a service insertion rule is initially configured such that all packets for a flow are forwarded to the security component for inspection. Then, based on the results of the inspection, as discussed herein, the service insertion rules are reconfigured to either drop packets for the flow at the source, or forward packets for the flow to their destination bypassing the security component.

Pre-filter behavior may be different for a security component functioning as an IPS than for a security component functioning as an IDS. If the security component functions as an IPS, it tracks idle transfer control protocol (TCP) flows and, if a flow is idle for a configured idle time, sends TCP resets to the source and destination and then removes the flow entry. Since the pre-filter component bypasses the security component using flow programming, for long lived flows (e.g., flows with packets that continue for an extensive amount of time), the security component working in IPS mode detects an idle flow and sends resets that would disrupt the connection. To avoid this issue, the security component functioning as an IPS should be configured to not send resets when a given flow is idle, and instead to remove the flow entry of the given flow.

By contrast, when security component functions as an IDS, it does not generate any TCP resets by default. Pre-filtering techniques described herein ensure that only packets that are relevant to a given service in the service chain are forwarded to the given service. Furthermore, certain embodiments may also allow a pre-filter component and/or service insertion rules to offload additional processing from a security component, such as by bypassing the security component for packets that the security component does not need to inspect. It is noted that, while certain embodiments described herein involve security-related services, such as IDS/IPS services, embodiments may be employed for pre-filtering traffic subject to processing by other types of services as well, such as load balancing and network address translation (NAT) services. Pre-filtering techniques may, in some embodiments, be implemented in a distributed fashion, such as by distributing a pre-filter service across a plurality of service VMs, in order to further optimize resource utilization and avoid bottlenecks.

In some embodiments, flow programming is used by the pre-filter component to further improve resource utilization, such as when the security component is a third-party IDS/IPS device that does not have the ability to trigger flow programming. If a security component can directly trigger flow programming, pre-filtering may not be needed. Embodiments of the present disclosure are therefore particularly useful in cases where a security component does not have the ability to trigger flow programming or when it is not known whether the security component has this ability.

For example, as discussed, once a security insertion rule is updated for a flow based on inspection of initial handshake packets (e.g., by the pre-filter component using flow programming), the service insertion platform bypasses the filter component and the security component for all subsequent packets in the flow. As such, pre-filter techniques allow flow programming to be used to avoid unnecessary resource usage regardless of whether the security component is aware of the flow programming technique or has knowledge of, for example, application programming interface (API) methods for performing flow programming. In alternative embodiments, the pre-filter component may directly modify a next hop of a given packet to bypass the security component as appropriate rather than performing flow programming.

Figure 1:
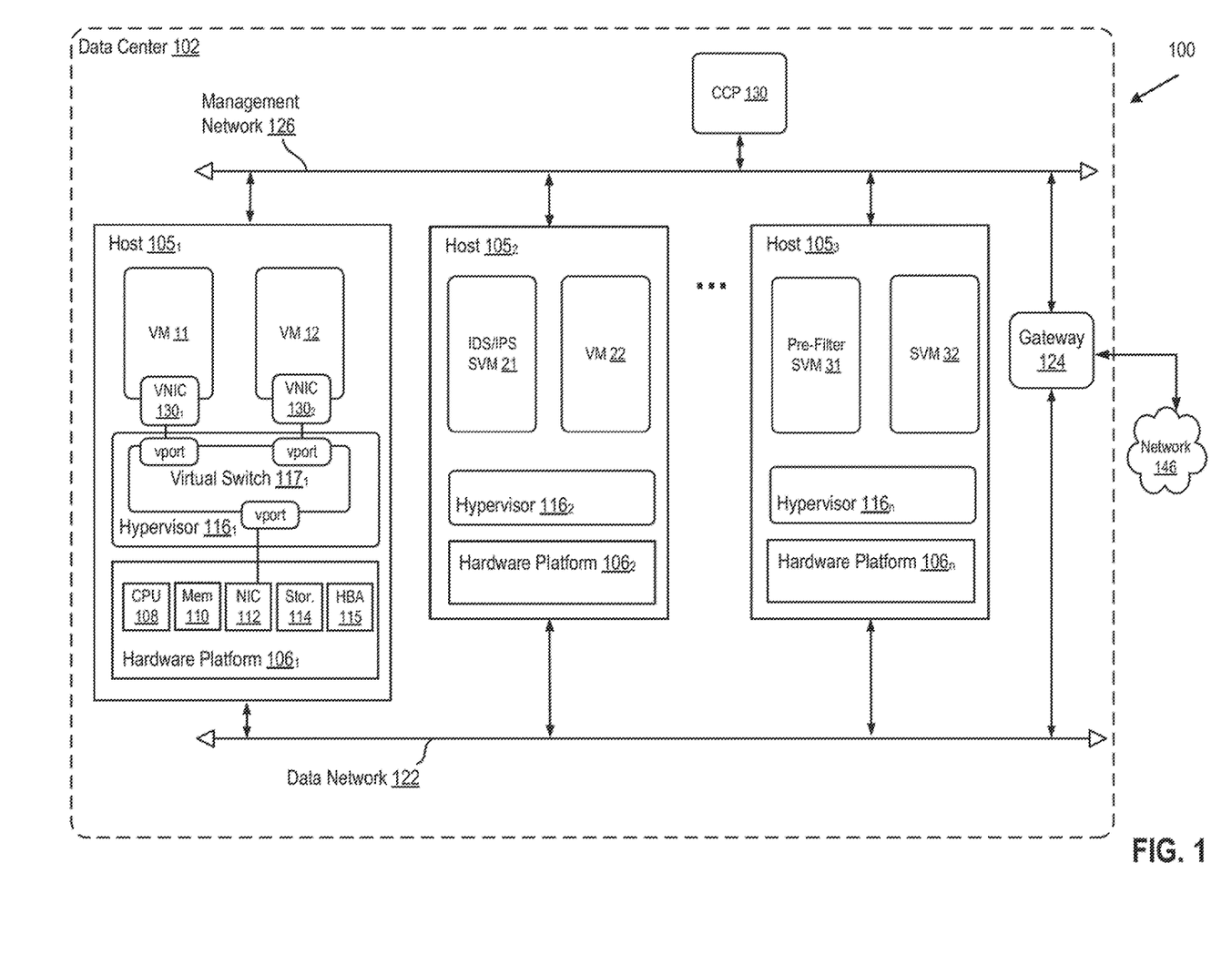
FIG. 1 depicts a computing environment in which one or more embodiments of the present disclosure may be utilized.

FIG. 1 depicts a block diagram of a computer system 100 in which one or more embodiments of the present disclosure may be utilized. Data center 102 may be an on-premises data center or a cloud data center. Data center 102 includes host(s) 105, a CCP 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual machines, e.g., VMs 11 and 12 on host $105_1$, IDS/IPS SVM 21, and VM 22 on host $105_2$, and pre-filter SVM 31 and SVM 32 on host $105_3$. VMs on the same host 105 may run concurrently. The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine.

Hardware platform 106 of host 105 may include components of a computing device such as one or more processors (CPUs) 108, system memory 110, a network interface 112, storage system 114, and other I/O devices (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 and external network 146. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Gateway 124 provides VMs and other components in data center 102 with connectivity to network 146. Network 146 may be, for example, a direct link, a local area network (LAN), a wide area network (WAN) such as the Internet, another type of network, or a combination of these. Gateway 124 may manage external public IP addresses for VMs and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

CCP 130 communicates with hosts 105 via a network, shown as a management network 126, and carries out CCP functions as discussed herein. CCP 130 is further configured to compute service paths as discussed herein. As discussed, CCP 130 may be a computer program that resides and executes in a node such as in a central server in data center 102 or, alternatively, in a virtual computing instance (e.g., a VM) in one of hosts 105. Further, CCP 130 may be distributed and run on several nodes, as discussed.

Hypervisor 116 can include a virtual switch 117, which serves as a software-based interface between virtual machines running on hosts 105, NIC 112, as well as other physical resources available on host 105. Though only host $105_1$ is shown including virtual switch $117_1$ for simplicity, it should be noted that each host 105 may include a virtual switch 117.

Each of the virtual machines running on host 105 may include a virtual network interface card (VNIC) 130, which is responsible for exchanging packets between the VM and hypervisor 116. Though only host $105_1$ is shown including VNICs $130_1$ and $130_2$ associated with VMs 11 and 12 for simplicity, it should be noted that each VM (including SVMs) on each host 105 may include a VNIC. VNICs 130 may be, in some cases, a software abstraction of a physical network interface card. Each of VNICs $130_1$ and $130_2$ is connected to a virtual port (vport) provided by virtual switch $117_1$, and virtual switch $117_1$ is connected to NIC 112 (via one or more vports) to allow network traffic to be exchanged between virtual machines executing on host 105 and other network destinations such as virtual machines hosted by other hosts on network 122, or devices reachable via an external network such as network 146.

One or more VMs in data center 102 may be associated with a particular service chain (e.g., for all traffic of the VM, for certain types of traffic of the VM, for traffic with a particular destination, etc.). The service chain may indicate one or more of a forward chain and a reverse chain associated with the VM. For example, the forward chain indicates a sequence of services to be performed for traffic that is outgoing from the VM. Further, the reverse chain indicates a sequence of services to be performed for traffic that is incoming to the VM.

In certain aspects, an administrator defines a service chain for the one or more VMs using the management plane, which is then sent to CCP 130. The administrator can define both the forward chain and a reverse chain of the service chain. The forward chain and reverse chain may include different services and/or have services in a different sequence than one another. In certain aspects, if the administrator only defines the forward chain (e.g., services A→B→C), then by default the reverse chain is the reverse sequence (e.g., services C→B→A) of the forward chain.

In certain aspects, CCP 130 is configured to communicate network configuration data to various network elements of hosts 105 to ensure traffic associated with a given VM is sent along the assigned service path and the appropriate services are applied to the traffic. In some embodiments CCP 130 implements a service insertion platform, while in other embodiments the service insertion platform is implemented in a distributed fashion across hosts 105, such as within hypervisors 116, and the service insertion platform sends configuration data to CCP 130 for distribution to all of hosts 105.

For example, to configure VM 11 with the forward service path pre-filter SVM 31→IDS/IPS SVM 21, CCP 130 would send network configuration information to each of hosts $105_1$-$105_3$. The network configuration information sent to each host could include a service table that indicates the MAC addresses of each SVM in each hop along the service path for VM 11. The service table may also indicate a virtual network interface (e.g., VNIC) of each SVM in each hop along the service path for VM 11. The service table may indicate (e.g., implicitly) that for any packet with a destination IP address of a destination outside of VM 11 and source IP address of VM 11, that the packet should be sent along the service path. In some embodiments, the service table also includes additional information, such as a protocol (e.g., TCP) and destination port (e.g., port 433). Each host 105 includes a local control plane (not shown) that is part of the hypervisor 116 that configures a kernel of the hypervisor 116 to implement the service table as associated with the VNICs 130 of the VMs and SVMs associated with the service path. For example, the kernel of the hypervisor $116_1$, when receiving a packet at VNIC $130_1$ from VM 11 with a destination outside of VM 11 is configured to set a next-hop MAC address of the packet to pre-filter SVM 31 based on the configuration by the LCP. Accordingly, the packet is forwarded to pre-filter SVM 31. Similarly, after pre-filter SVM 31 receives and services the packet by performing pre-filter techniques described herein, it is sent to IDS/IPS SVM 21 (unless pre-filter SVM 31 determines that the packet does not need to be serviced by IDS/IPS SMV 21). IDS/IPS SVM 21 then receives and services the packet, and it is sent to its destination. It should be noted that the kernel of the hypervisor implementing the service table and forwarding the packet is just an example, and other components may implement the service table and forward the packet as discussed, such as a component in the user space, a "Domain 0" or "Root Partition" virtual machine, etc.

The service insertion platform provides packet metadata that can be used by services to augment their inspection or alter packet forwarding along the service path. Metadata is carried per-packet, in-line, inside a header. Services, such as pre-filter SVM 31, IDS/IPS SVM 21, or other components, can invoke methods, such as API methods, of the service insertion platform in order to alter forwarding for packets of a certain flow at their source, such as by indicating to the source that subsequent packets of a given flow do not need to be forwarded to one or more services in the service path such as by either forwarding the packets to the destination or dropping the packets. For example, a service table may be altered at a source of a flow of packets, such as VNIC $130_1$ of VM 11, to handle packets at the source accordingly.

Pre-filter SVM 31 generally represents a pre-filter component that is used to perform techniques described herein. While pre-filter SVM 31 is depicted as a single VCI, alternative embodiments include distributing the pre-filter across multiple SVMs, such as SVMs 31 and 32 or implementing the pre-filter as a component of hypervisor 116. Interposing a pre-filter (e.g., pre-filter SVM 31) before a given service (e.g. IDS/IPS SVM 21) in a service chain allows the pre-filter to effectively monitor all traffic going to the given service and effectively bypass the given service when further processing is not needed.

In certain embodiments, pre-filter SVM 31 determines certain aspects of the configuration of IDS/IPS SVM 21. By exposing aspects of the service configuration to the pre-filter, identification of packets that IDS/IPS SVM 21 does not need to examine can be delegated to pre-filter SVM 31, without unnecessarily overloading IDS/IPS SVM 21. This configuration can be exposed to pre-filter SVM 31 in many ways, such as by data path-level solutions (including performing domain name system snooping to match IP addresses corresponding to domain names configured in a white list or exception list of IDS/IPS SVM 21), or distributing configuration from the management plane. Alternatively, IDS/IPS SVM 21 and/or pre-filter SVM 31 may allow creation of policy rules (e.g., by a user such as a network administrator) to define traffic to be excluded from redirection to IDS/IPS SVM 21.

Alternatively, configuration events may be logged by IDS/IPS SVM 21 or otherwise exposed directly or indirectly to pre-filter SVM 31 and/or the service insertion platform. One technique for obtaining configured rules from the IDS/IPS involves configuring a logging method for the IDS/IPS to be "remote logging". The IPS/IDS sends the logs to a remote server, which may be the management plane. As such, the management plane receives live configuration events, parses these configuration events to identify rules (e.g., exception/whitelist rules), and converts the rules to a native format before pushing them to hypervisors (e.g., hypervisor $116_2$ running IDS/IPS SVM 21). For example, translation of service rules to service insertion rules (e.g., by the management plane) might involve translating DNS names or other high-level constructs into elements that can be managed by packet filters, such as IP addresses, such as by guest introspection, DNS snooping or similar techniques. When possible, the service insertion platform, such as hypervisor $116_2$ running IDS/IPS SVM 21, may receive these rules. The pre-filter rules may not be configured inside pre-filter SVM 31, and generally comprise service insertion rules (or, in some cases, firewall rules with action set to "redirect traffic to pre-filter SVM"). In some embodiments, the service insertion platform may use the determined service configuration data to dynamically reconfigure service insertion at the source, such as VNIC $130_1$ of VM 11, bypassing pre-filter SVM 31 as well as IDS/IPS SVM 21 altogether.

In an example, a white list maintained by IDS/IPS SVM 21 is filtered and translated by the service insertion module in the management plane into service insertion rules that cause the IDS/IPS SVM 21 and/or pre-filter SVM 31 to be dynamically bypassed for all traffic that corresponds to the white list.

In certain embodiments, pre-filter SVM 31 uses the rules to perform pre-filtering on all traffic it receives, such as each given packet routed to pre-filter SVM 31 according to the service path applicable to the given packet (e.g., all packets sent by VM 11 may have a service path of pre-filter SVM 31→IDS/IPS SVM 21). The rules may include, for example, a white list or exception list, blacklist, an indication that IDS/IPS SVM 21 only needs to service initial handshake packets, and/or the like. In one example, a rule specifies that traffic classified in a certain URL category is classified as financial or health-related traffic, and is excluded from decryption. As such, any traffic that pre-filter SVM 31 determines to fall within the certain URL category is not sent to IDS/IPS SVM 21 for decryption and inspection, and is instead sent directly to its destination (or a next hop). Alternatively, pre-filter SVM 31 may perform flow programming in order to bypass itself and IDS/IPS SVM 21.

In another example, pre-filter SVM 31 (or VM 11 or hypervisor 116) determines whether packets have a destination IP address that corresponds to a white list (e.g., based on DNS translation performed by the management plane), and does not send whitelisted packets to IDS/IPS SV 21.

In another example, pre-filter SVM 31 determines whether each packet it receives is an initial handshake packet for a given flow, forwarding initial handshake packets to IPS/IDS SVM 21 for servicing. When the initial handshake for a given flow has completed, pre-filter SVM 31 may perform flow programming to indicate to the service insertion platform that subsequent packets in the given flow do not need to be sent to pre-filter SVM 31 or IDS/IPS SVM 21, and instead should be dropped or forwarded to their destination based on the inspection of the initial handshake packets by IDS/IPS SVM 21.

IDS/IPS SVM 21 generally represents a security component that performs IDS and/or IPS services, such as DPI. In an example, IDS/IPS SVM 21 performs decryption and deep inspection of encrypted traffic. Use of pre-filter SVM 31 to avoid unnecessarily sending packet to IDS/IPS SVM 21 may result in significant improvements in resource utilization. In one example, pre-filter SVM 31 is implemented in a distributed fashion, further improving load balancing and resource utilization in data center 102.

Figure 2:
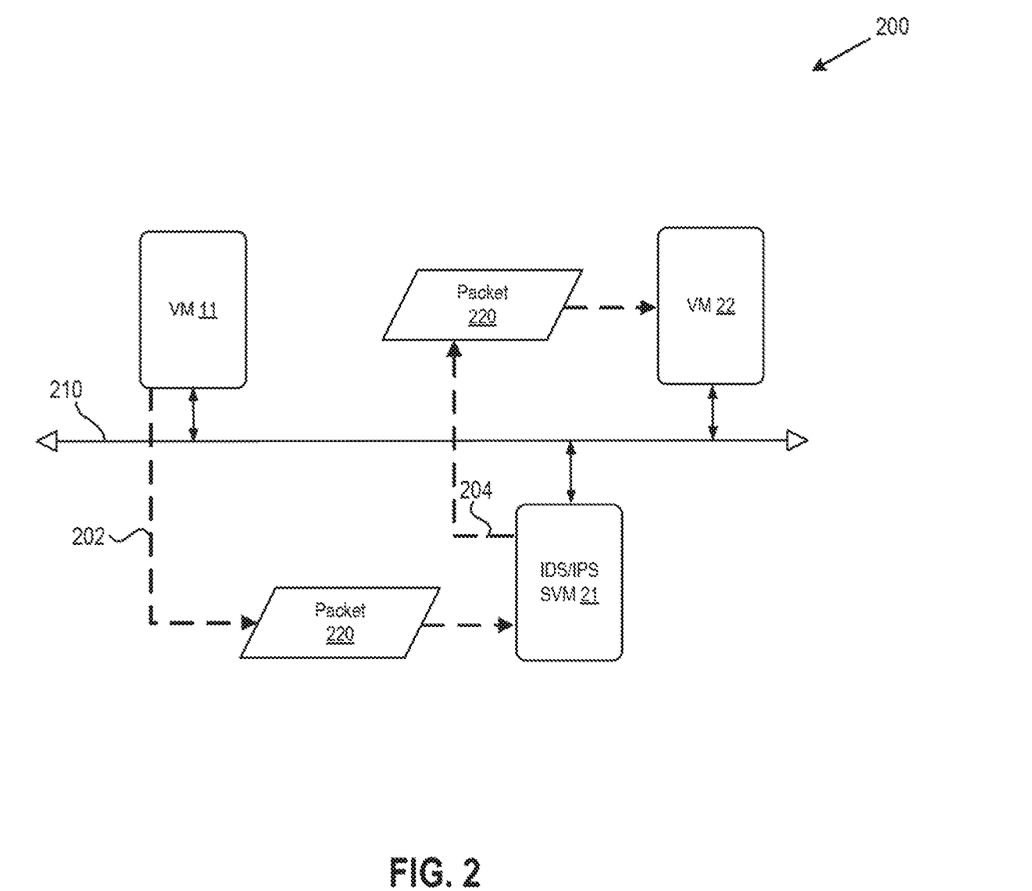
FIG. 2 depicts an example of service insertion according to certain techniques.

FIG. 2 depicts an example 200 of service insertion according to certain techniques. Example 200 includes VMs 11 and 22 and IDS/IPS SVM 21 of FIG. 1 connected by a logical switch 210. In some embodiments, logical switch 210 is implemented as one or more virtual switches and VTEPs on one or more hosts, such as virtual switch 117 of FIG. 1. It should be noted that though VM 11, VM 22, and IDS/IPS SVM 21 are illustrated as coupled to the same logical switch 210 for ease of description, IDS/IPS SVM 21 may be coupled to a different logical switch than logical switch 210. The two logical switches may then be communicatively coupled via a logical router. Such additional logical switches and logical routers may also be implemented as one or more virtual routers, virtual switches, and VTEPs on one or more hosts.

In example 200, a service path defined by a service insertion platform indicates that all traffic sent by VM 11 is to be routed to IDS/IPS SVM 21. As such, at 202, a packet 220 with a source IP address of VM 11 and a destination IP address of VM 22 is routed to IDS/IPS SVM 21, such as by the VNIC of VM 11 setting a next hop destination MAC address of packet 220 to the MAC address of IDS/IPS SVM 21 based on the service table associated with the service path. For example, packet 220 may be encapsulated with a service header and then sent to IDS/IPS SVM 21. IDS/IPS SVM 21 performs IDS and/or IPS services for packet 220, such as by performing DPI. Based on inspection of packet 220, IDS/IPS SVM 21 may drop packet 220, for example, if it does not comply with security rules. If based on inspection packet 220 does comply with security rules, at 204, packet 220 is routed by IDS/IPS SVM 21 its destination of VM 22, such as by setting a next hop destination MAC address of packet 220 to the MAC address of VM 22 based on the service table associated with the service path and the destination IP address of VM 22 in packet 220.

IDS/IPS SVM 21 may potentially become a bottleneck in example 200, as all traffic from VM 11 is routed to IDS/IPS SVM 21 before it is dropped or sent to its destination. For example, even packets for which IDS/IPS SVM 21 does not need to or cannot perform DPI are still routed to IDS/IPS SVM 21. In one example, IDS/IPS SVM 21 determines that some packets correspond to a white list and sends the packets to their destination without performing DPI. In another example, IDS/IPS SVM 21 determines that some packets are not initial handshake packets for a flow for which only initial handshake packets are to be inspected, and based on inspection of the initial handshake packets for the flow, sends the packets to their destination or drops the packets without performing DPI. For example, an allow or drop determination may be made based on an exception or a white list. Receiving and performing initial processing on these packets causes congestion at IDS/IPS SVM 21, slowing down the flow of traffic and delaying servicing of other packets for which DPI is needed. Furthermore, IDS/IPS SVM 21 may be a third-party device that cannot perform flow programming. Accordingly, as described below with respect to FIGS. 3A-3B, embodiments of the present disclosure involve pre-filtering traffic subject to service insertion.

Figure 3A:
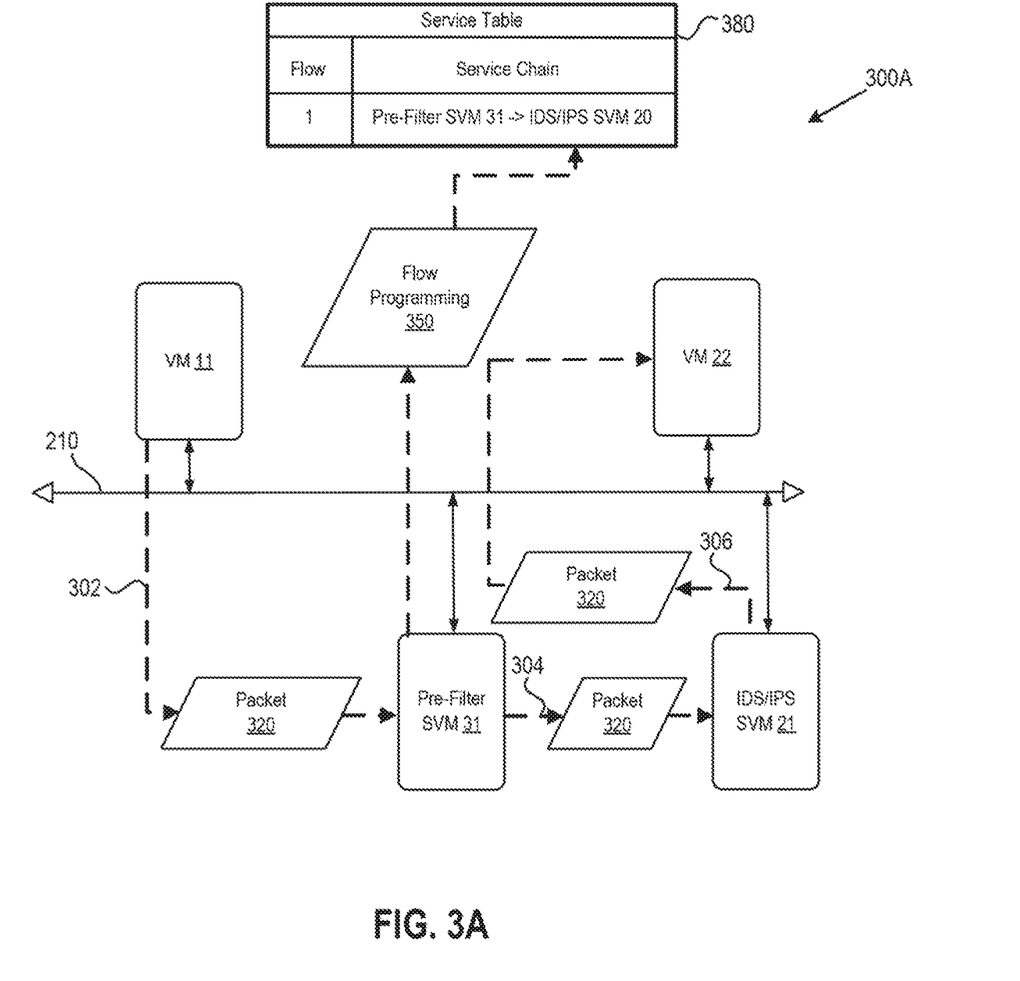
FIGS. 3A and 3B depict examples of pre-filtering traffic subject to service insertion according to certain embodiments of the present disclosure.
Figure 3B:
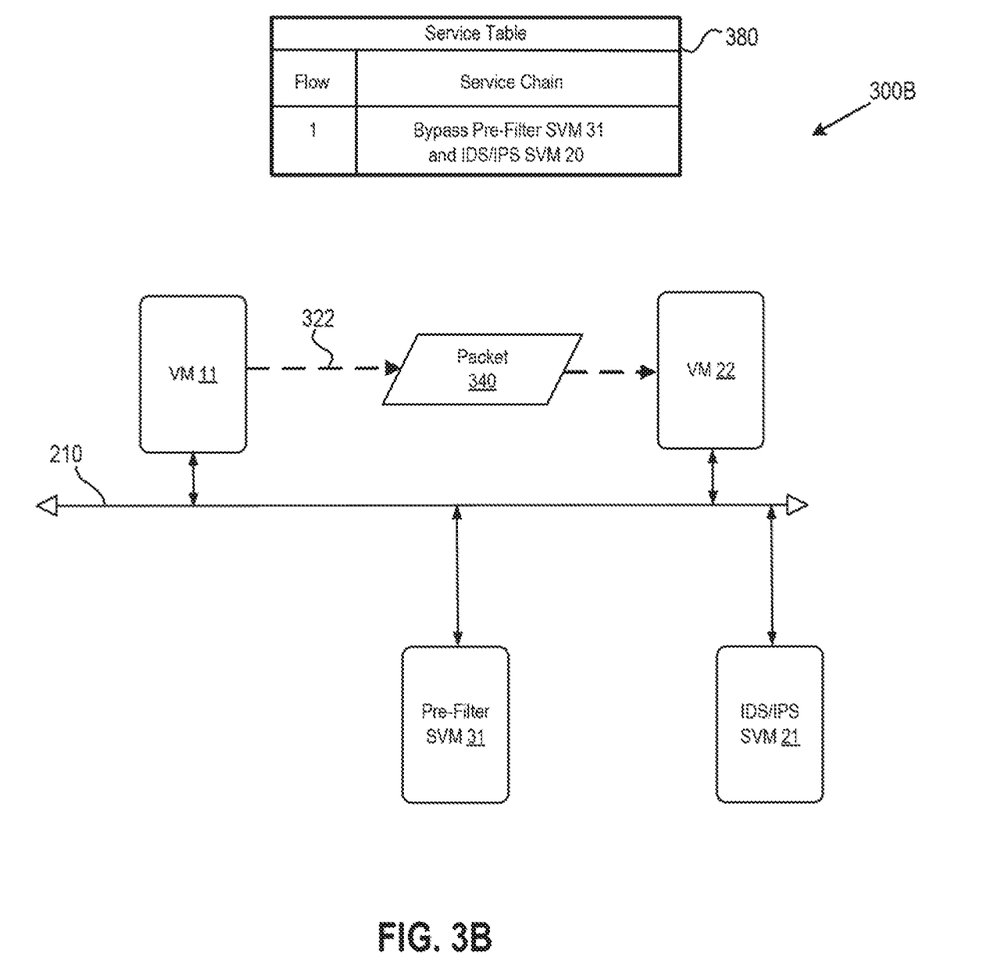

FIGS. 3A and 3B depict examples 300A and 300B of pre-filtering traffic subject to service insertion according to certain embodiments of the present disclosure. FIGS. 3A and 3B include VMs 11 and 22, pre-filter SVM 31, and IDS/IPS SVM 21 of FIG. 1 connected by logical switch 210 of FIG. 2. It should be noted that though VM 11, VM 22, pre-filter SVM 31, and IDS/IPS SVM 21 are illustrated as coupled to the same logical switch 210 for ease of description, IDS/IPS SVM 21 and pre-filter SVM 31 may be coupled to a different logical switch than logical switch 210. The two logical switches may then be communicatively coupled via a logical router. Such additional logical switches and logical routers may also be implemented as one or more virtual routers, virtual switches, and VTEPs on one or more hosts.

In example 300A, a service path defined by a service insertion platform indicates that all traffic that meets certain conditions (e.g., traffic of certain types, such as https or ssh traffic, sent by VM 11) is to be routed to pre-filter SVM 31 and then to IDS/IPS SVM 21. For example, the service path may be defined in a service table 380. While service table 380 shows a service path of "pre-filter SVM 31→IDS/IPS SVM 21" for packets of flow "1" (e.g., representative of a flow identifier), each SVM in the service path may actually be represented in service table 380 by MAC addresses, virtual network interfaces, and/or other identifying information. In some embodiments, rather than mapping service paths to flows, service table 380 maps service paths to certain conditions. As such, at 302, a packet 320 with a source IP address of VM 11 and a destination IP address of VM 22 is routed to pre-filter SVM 31, such as by the VNIC of VM 11 setting a next hop destination MAC address of packet 320 to the MAC address of pre-filter SVM 31 based on the service table associated with the service path. In some embodiments, packet 320 may include a header (e.g., network service header (NSH), Geneve header, or the like), as, in some embodiments, all packets sent to or received from pre-filter SVM 31 contain a header. In an example, packet 320 is an SSL handshake packet of a flow for which a rule of IDS/IPS SVM 21 states that only SSL initial handshake packets are subject to DPI by IDS/IPS SVM 21. Pre-filter SVM 31 has determined this rule of IDS/IPS SVM 21, such as based on configuration information received from the management plane. As such, pre-filter SVM 31 inspects the SSL header and determines that, because packet 320 is an SSL handshake packet of the flow, packet 320 is subject to DPI by IDS/IPS SVM 21. Accordingly, at 304, pre-filter SVM 31 forwards packet 320 to IDS/IPS SVM 21, which performs DPI on packet 320. For example, to forward packet 320, the VNIC of pre-filter SVM 31 sets a next hop destination MAC address of packet 320 to the MAC address of IDS/IPS SVM 21 based on the service table associated with the service path. Based on inspection of packet 320, IDS/IPS SVM 21 may drop packet 320, for example, if it does not comply with security rules. Further, IDS/IPS SVM 21 or another component as discussed may reconfigure the service insertion platform to drop packets of the flow at the source, such as at the VNIC of VM 11. If based on inspection packet 320 does comply with security rules, at 306, packet 320 is routed by IDS/IPS SVM 21 to its destination of VM 22, such as by setting a next hop destination MAC address of packet 320 to the MAC address of VM 22 based on the service table associated with the service path and the destination IP address of VM 22 in packet 320. Further, IDS/IPS SVM 21, pre-filter SVM 31, or another component as discussed may reconfigure the service insertion platform to forward packets of the flow at the source, such as at the VNIC of VM 11, to VM 22 and bypass IDS/IPS SVM 21 and pre-filter SVM 31. In some embodiments, IDS/IPS SVM 21 is a third-party device that does not support flow programming. As such, pre-filter SVM 31 performs flow programming 350 as appropriate to modify service table 380. For example, upon determining that an SSL handshake sequence has completed, pre-filter SVM 21 may perform flow programming 350 to update service table 380 to reflect that future packets in the flow do not need to be sent to either IDS/IPS SVM 21 or pre-filter SVM 31.

In example 300B, VM 11 sends packet 340 to destination VM 22. Packet 340 is a subsequent packet in the same flow as packet 320, and IDS/IPS SVM 21 determined that packet 320 complied with security rules (or IDS/IPS SVM 21 determined that an SSL handshake sequence had completed). As such, the service insertion platform is reconfigured (e.g., by removing IDS/IPS SVM 21 and pre-filter SVM 31 from the service path for the flow in service table 380, thereby bypassing IDS/IPS SVM 21 and pre-filter SVM 31), and packet 340 is routed directly from its source to its destination VM 22 at 322, bypassing both pre-filter SVM 31 and IDS/IPS SVM 21.

Figure 4:
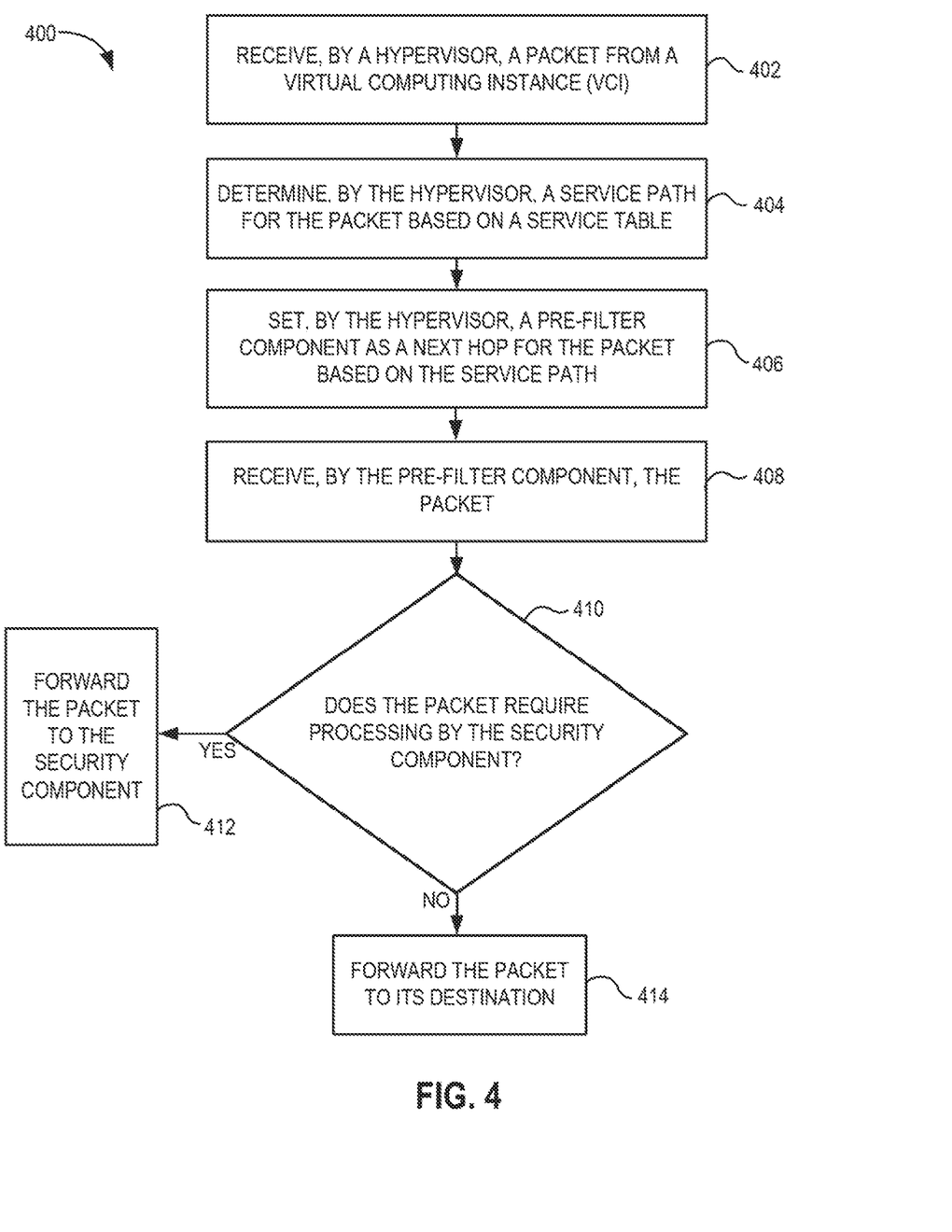
FIG. 4 depicts a flowchart of example operations for pre-filtering traffic subject to service insertion according to one or more embodiments of the present invention.

FIG. 4 depicts example operations 400 for pre-filtering traffic subject to service insertion according to embodiments of the present disclosure.

At step 402, a hypervisor receives a packet from a VCI. In an embodiment, VNIC $130_1$ and/or virtual switch $117_1$ of hypervisor $116_1$ receives a packet from VM 11. A destination of the packet may be a virtual or physical entity on the same or a different host and/or in the same or a different network as the VCI.

At step 404, the hypervisor determines a service path for the packet based on a service table. For instance, VNIC $130_1$ and/or virtual switch $117_1$ of hypervisor $116_1$ may access a service table generated by a service insertion platform that maps service paths to conditions associated with packets. In one example, the service table indicates that all traffic to a given destination, such as VM 11, is to be sent along a particular service path, such as pre-filter SVM 31→IDS/IPS SVM 21 of FIG. 3A.

At step 406, the hypervisor sets a pre-filter component as a next hop for the packet based on the service path. In an example, VNIC $130_1$ and/or virtual switch $117_1$ of hypervisor $116_1$ sets pre-filter SVM 31 of FIG. 3A as the next hop for the packet according to the service path, and the packet is sent to pre-filter SVM 31 of FIG. 3A.

At step 408, the pre-filter component receives the packet.

In some embodiments, the hypervisor has already filtered traffic using one or more rules, such as a white list, and only traffic that the hypervisor determines to be white listed is sent to the pre-filter component. The white list may, for example, include destination IP addresses, TCP protocols, and destination port numbers.

At step 410, the pre-filter component makes a determination of whether the packet requires processing by the security component. For example, the pre-filter component may determine whether or not the packet is part of an SSL handshake of a flow, whether or not the packet is encrypted, and/or whether or not the packet meets other conditions. In one example, packets that are part of an SSL handshake of a flow require processing by the security component, while packets that are not part of the SSL handshake do not require processing by the security component. If the packet is determined to require processing by the security component, then operations continue at step 414. Otherwise, operations continue at step 416.

At step 412, having determined that the packet requires processing by the security component, the pre-filter component forwards the packet to the security component. In the event that the pre-filter component forwards the packet to the security component, the security component services the packet. For example, IDS/IPS SVM 21 of FIG. 3A may perform DPI on the packet.

At step 414, having determined that the packet does not require processing by the security component, the pre-filter component forwards the packet to its destination.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method for pre-filtering traffic in a logical network, comprising:
   receiving, by a hypervisor, a packet from a virtual computing instance (VCI);
   determining, by the hypervisor, a service path for the packet based on a service table;
   setting, by the hypervisor, a pre-filter component as a next hop for the packet based on the service path;
   receiving, by the pre-filter component, the packet;
   making a determination, by the pre-filter component, of whether the packet requires processing by a security component;
   performing, by the pre-filter component, based on the determination, one of:
      forwarding the packet to its destination and bypassing the security component; or
      forwarding the packet to the security component; and
      determining, by the pre-filter component, based on the packet, whether to perform one or more actions to reconfigure the hypervisor to bypass the pre-filter component for subsequent packets in a flow associated with the packet.

2. The computer-implemented method of claim 1, wherein determining, by the hypervisor, the service path for the packet based on the service table comprises determining, by the hypervisor, that the packet meets a condition that is associated with the service path in the service table.

3. The computer-implemented method of claim 1, wherein making the determination, by the pre-filter component, of whether the packet requires processing by the security component comprises determining whether the packet is a handshake packet.

4. The computer-implemented method of claim 3, wherein:

if the packet is a handshake packet, the pre-filter component forwards the packet to the security component; and if the packet is not a handshake packet, the pre-filter component forwards the packet to its destination and bypasses the security component.

5. The computer-implemented method of claim 3, wherein determining whether the packet is a handshake packet is based on a header of the packet.

6. The computer-implemented method of claim 1, further comprising:
   determining, by the re-filter component,
   to perform the one or more actions and to perform one or more additional actions to reconfigure the hypervisor to bypass the security component for the subsequent packets.

7. The computer-implemented method of claim 6, wherein the one or more actions and the one or more additional actions comprise performing flow programming.

8. A system, comprising one or more processors and a non-transitory computer readable medium comprising instructions that, when executed by the one or more processors, cause the system to perform a method for pre-filtering traffic in a logical network, the method comprising:
   receiving, by a hypervisor, a packet from a virtual computing instance (VCI);
   determining, by the hypervisor, a service path for the packet based on a service table;
   setting, by the hypervisor, a pre-filter component as a next hop for the packet based on the service path;
   receiving, by the pre-filter component, the packet;
   making a determination, by the pre-filter component, of whether the packet requires processing by a security component;
   performing, by the pre-filter component, based on the determination, one of:
      forwarding the packet to its destination and bypassing the security component; or
      forwarding the packet to the security component; and
   determining, by the pre-filter component, based on the packet, whether to perform one or more actions to reconfigure the hypervisor to bypass the pre-filter component for subsequent packets in a flow associated with the packet.

9. The system of claim 8, wherein determining, by the hypervisor, the service path for the packet based on the service table comprises determining, by the hypervisor, that the packet meets a condition that is associated with the service path in the service table.

10. The system of claim 8, wherein making the determination, by the pre-filter component, of whether the packet requires processing by the security component comprises determining whether the packet is a handshake packet.

11. The system of claim 10, wherein:
   if the packet is a handshake packet, the pre-filter component forwards the packet to the security component; and
   if the packet is not a handshake packet, the pre-filter component forwards the packet to its destination and bypasses the security component.

12. The system of claim 10, wherein determining whether the packet is a handshake packet is based on a header of the packet.

13. The system of claim 8, wherein the method further comprises:
   determining, by the pre-filter component,
   to perform the one or more actions and to perform one or more additional actions to reconfigure the hypervisor to bypass the security component for the subsequent packets.

14. The system of claim 13, wherein the one or more actions and the one or more additional actions comprise performing flow programming.

15. A non-transitory computer readable medium comprising instructions that, when executed by one or more processors of a computing system, cause the computing system to perform a method for pre-filtering traffic in a logical network, the method comprising:
   receiving, by a hypervisor, a packet from a virtual computing instance (VCI);
   determining, by the hypervisor, a service path for the packet based on a service table;
   setting, by the hypervisor, a pre-filter component as a next hop for the packet based on the service path;
   receiving, by the pre-filter component, the packet;
   making a determination, by the pre-filter component, of whether the packet requires processing by a security component;
   performing, by the pre-filter component, based on the determination, one of:
      forwarding the packet to its destination and bypassing the security component; or
      forwarding the packet to the security component; and
   determining, by the pre-filter component, based on the packet, whether to perform one or more actions to reconfigure the hypervisor to bypass the pre-filter component for subsequent packets in a flow associated with the packet.

16. The non-transitory computer readable medium of claim 15, wherein determining, by the hypervisor, the service path for the packet based on the service table comprises determining, by the hypervisor, that the packet meets a condition that is associated with the service path in the service table.

17. The non-transitory computer readable medium of claim 15, wherein making the determination, by the pre-filter component, of whether the packet requires processing by the security component comprises determining whether the packet is a handshake packet.

18. The non-transitory computer readable medium of claim 17, wherein:
   if the packet is a handshake packet, the pre-filter component forwards the packet to the security component; and
   if the packet is not a handshake packet, the pre-filter component forwards the packet to its destination and bypasses the security component.

19. The non-transitory computer readable medium of claim 17, wherein determining whether the packet is a handshake packet is based on a header of the packet.

20. The non-transitory computer readable medium of claim 15, wherein the method further comprises:
   determining, by the re-filter component,
   to perform the one or more actions and to perform one or more additional actions to reconfigure the hypervisor to bypass the security component for the subsequent packets.

\* \* \* \* \*